US008527609B2

(12) United States Patent
Huang et al.

(10) Patent No.: US 8,527,609 B2
(45) Date of Patent: Sep. 3, 2013

(54) SERIALIZING DOCUMENT EDITING COMMANDS

(75) Inventors: Jeffrey Huang, Mountain View, CA (US); Dachuan Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 12/939,171

(22) Filed: Nov. 4, 2010

(65) Prior Publication Data

US 2012/0117194 A1    May 10, 2012

(51) Int. Cl.
*G06F 15/173* (2006.01)
(52) U.S. Cl.
USPC .......................................... 709/219; 715/229
(58) Field of Classification Search
None
See application file for complete search history.

(56) References Cited

U.S. PATENT DOCUMENTS

| 6,901,425 | B1 | 5/2005 | Dykes et al. | |
|---|---|---|---|---|
| 6,993,528 | B1 | 1/2006 | Aver et al. | |
| 7,607,129 | B2* | 10/2009 | Rosu et al. | 718/1 |
| 7,769,810 | B1* | 8/2010 | Kaufman | 709/205 |
| 7,814,210 | B1* | 10/2010 | Mueller et al. | 709/227 |
| 8,131,860 | B1* | 3/2012 | Wong et al. | 709/228 |
| 2003/0163570 | A1 | 8/2003 | Hendley et al. | |
| 2007/0220417 | A1* | 9/2007 | Mathew et al. | 715/511 |
| 2008/0077848 | A1* | 3/2008 | Roberts | 715/229 |
| 2008/0127158 | A1* | 5/2008 | Carlos | 717/168 |
| 2008/0177800 | A1 | 7/2008 | Arkhipov et al. | |
| 2008/0201417 | A1 | 8/2008 | McCain et al. | |
| 2008/0303835 | A1 | 12/2008 | Swift et al. | |
| 2008/0303837 | A1 | 12/2008 | Swift et al. | |
| 2010/0013842 | A1 | 1/2010 | Green et al. | |

OTHER PUBLICATIONS

"A proposal for Webapps", Retrieved at << http://www.w3.org/People/Bos/webapps-proposal.html >>, Jul. 5, 2004, pp. 8.
Feigenbaum, Barry, "Take command of your client/server apps", Retrieved at << http://www.ibm.com/developerworks/java/library/j-cs/index.html >>, Jun. 12, 2001, pp. 9.
Herlocker, et al., Commands as Media: Design and Implementation of a Command Stream, Retrieved at << http://citeseerx.ist.psu.edu/viewdoc/download?doi=10.1.1.40.1749&rep=rep1&type=ps. >>, Proceedings of the third ACM international conference on Multimedia, Nov. 5-9, 1995, pp. 11.
Lawrence, Mark, "Comparing Direct2D and GDI", Retrieved at << http://blogs.msdn.com/b/directx/archive/2009/09/29/comparing-direct2d-and-gdi.aspx?PageIndex=2 >>, Sep. 28, 2009, pp. 3.

(Continued)

*Primary Examiner* — Ario Etienne
*Assistant Examiner* — Clayton R Williams
(74) *Attorney, Agent, or Firm* — Hope Baldauff, LLC

(57) ABSTRACT

A command stream is generated that includes serialized commands for editing a document. The command stream can be applied to a modified document to generate a single document that contains modifications to the document made using both a Web application and a client application. The command stream can also be utilized to recreate the edited state of a document following the disconnection from a Web application for editing the document, to load balance a server computer hosting the Web application even while editing sessions are in progress, to perform an upgrade of a server hosting the Web application while editing sessions are in progress, and for other purposes.

17 Claims, 9 Drawing Sheets

(56) References Cited

OTHER PUBLICATIONS

"Introduction to PowerPoint Web App", Retrieved at << http://office.microsoft.com/en-in/web-apps-help/introduction-to-powerpoint-web-app-HA010378340.aspx >>, Retrieved Date: Aug. 17, 2010, pp. 4.

Hild, et al., "Pro SharePoint 2010 Solution Development", Retrieved at << http://c2.api.ning.com/files/IDNX1Nc1b5T77sX3W66Hm-B2e0XZEwbxuysgvhl2Haa-neZIKjmkpPDYMp4REmA9C-golzngo6Bbj2TuqfHEz31KHrAl7Ht9nX/ProSharePoint2010-SolutionDevelopment.pdf >>, 2010, pp. 393.

"Graphics Architecture Studies", Retrieved at << http://www.graphics.stanford.edu/projects/flashg/studies/ >>, Retrieved Date: Aug. 17, 2010, pp. 3.

"International Search Report", Mailed Date: May 29, 2012, Application No. PCT/US2011/057611, Filed Date: Oct. 25, 2011, pp. 8.

* cited by examiner

SERIALIZING DOCUMENT EDITING COMMANDS

BACKGROUND

World Wide Web ("Web") applications have been developed that allow the creation and editing of rich documents. For instance, Web applications are available for creating and editing word processing documents, spreadsheets, presentations, and other types of documents. These documents might also be created and edited in a compatible client application. For instance, a word processing client application might be executed on a desktop or laptop computer and utilized to create a word processing document. The word processing document might then be edited utilizing a suitable Web application.

One problem with current Web applications occurs when a user of the Web application edits a document simultaneously with the editing of the document by another user utilizing a client application. In this scenario, two versions of the document are generated. One version of the document contains the edits made using the Web application and a second version of the document contains the edits made using the client application. It can be difficult to reconcile the changes between the two versions of the document.

Another problem with current Web applications occurs when a client application, such as a Web browser application, becomes disconnected from a server hosting the Web application. In this scenario, it can be difficult to revert an edited document to its previous state when a connection is reestablished. Consequently, edits to a document can be lost when a disconnection occurs.

Other problems with current Web applications can occur because it can be difficult to migrate in-progress editing sessions between server computers. For instance, if a Web server that implements the Web application and hosts editing sessions becomes overloaded, it can be difficult to migrate in-progress editing sessions to another server to balance the load. Similarly, it can be difficult to upgrade the Web application on a server computer that has in-progress editing sessions.

It is with respect to these and other considerations that the disclosure made herein is presented.

SUMMARY

Technologies are described herein for serializing document editing commands. Through an implementation of the concepts and technologies presented herein, a single document can be generated that contains modifications to a document made using both a Web application and a client application. Through an implementation of the concepts and technologies presented herein, the edited state of a document can also be recreated following the disconnection from a Web application. Additionally, servers hosting Web applications can be load balanced and upgraded even while editing sessions are in-progress.

According to one aspect presented herein, a Web application is provided for creating and editing documents. For instance, in one implementation, the Web application provides functionality for creating and editing a presentation document using a conventional Web browser application program. The Web application stores the document or has access to a network location storing the document.

Commands for modifying the document are generated through the Web browser application program and transmitted to the Web application executing on a server computer. The Web application receives the commands and serializes the commands. This might include, for instance, adding data to the commands indicating the time at which the commands were received and arranging the commands in time order. The serialized commands are then stored in a command stream. The command stream is stored separately from the document. It should be appreciated that the command stream represents the difference, which may be referred to herein as a "delta", between the original document and its current state. Application of the commands stored in the command stream to the document will result in the current state of the document.

According to another aspect, the command stream may be applied to the document when a request is received via the Web application to save the document. For instance, when a request is received to save the document, the commands in the command stream may be applied to the document in serial order (i.e. the order in which the commands were originally made). The document may then be saved once the commands have been applied to the document.

According to another aspect, the command stream described above may be utilized to enable co-authoring. For instance, in one example, a client application might modify a document to create a modified document. The Web application might be utilized to edit the same document, resulting in the creation of a command stream. In order to reconcile the changes between the two versions of the document, the commands in the command stream may be applied to the modified document. In this way, the resulting document includes edits applied to the document by way of the client application and edits applied to the document by way of the Web application.

According to another aspect, the command stream described above can be utilized to improve the performance of a Web application. For instance, a Web application may be configured to maintain a command stream in a volatile memory, such as a Random Access Memory ("RAM"), for documents as described above. In order to free memory, the document and the command stream may be stored to a mass storage device, such as a hard disk drive, and unloaded from the volatile memory. When additional commands are received for the document, the document may be returned to its current state by applying the stored command stream to the document. The additional commands may then be serialized into a command stream in the manner described above.

According to another aspect, the command stream may be utilized to perform dynamic load balancing on the server computers that provide the Web application. In this implementation, one or more highly loaded server computers are identified. In-progress document editing sessions are then identified on the highly loaded server computers. For each of the identified editing sessions, the command stream for a document is applied to the document. The document is then moved to a non-highly loaded server computer. In other embodiments, the command stream and the document might be moved to the non-highly loaded server computer without applying the command stream to the document. The server computer to which the document is moved then takes over responsibility for handling the editing session.

According to another aspect, the command stream may be utilized to perform an uninterrupted upgrade on a server computer that hosts the Web application. In particular, an in-progress editing session is identified on a server computer that is executing a down level version of the Web application. The document and command stream associated with the identified in-progress editing session are then moved to a server computer executing an up level version of the Web application. The editing session is then resumed at the server computer to which the document and command stream have been moved. Once all of the in-progress editing sessions on a down level server have been moved in this manner, the Web application on the server can be upgraded. In one implementation, the commands in the command stream are applied to the document prior to moving the document to the server computer executing the up level Web application.

It should be appreciated that the command stream described herein might also be utilized for other purposes, such as undo/redo, document recovery, and others. It should also be appreciated that this Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
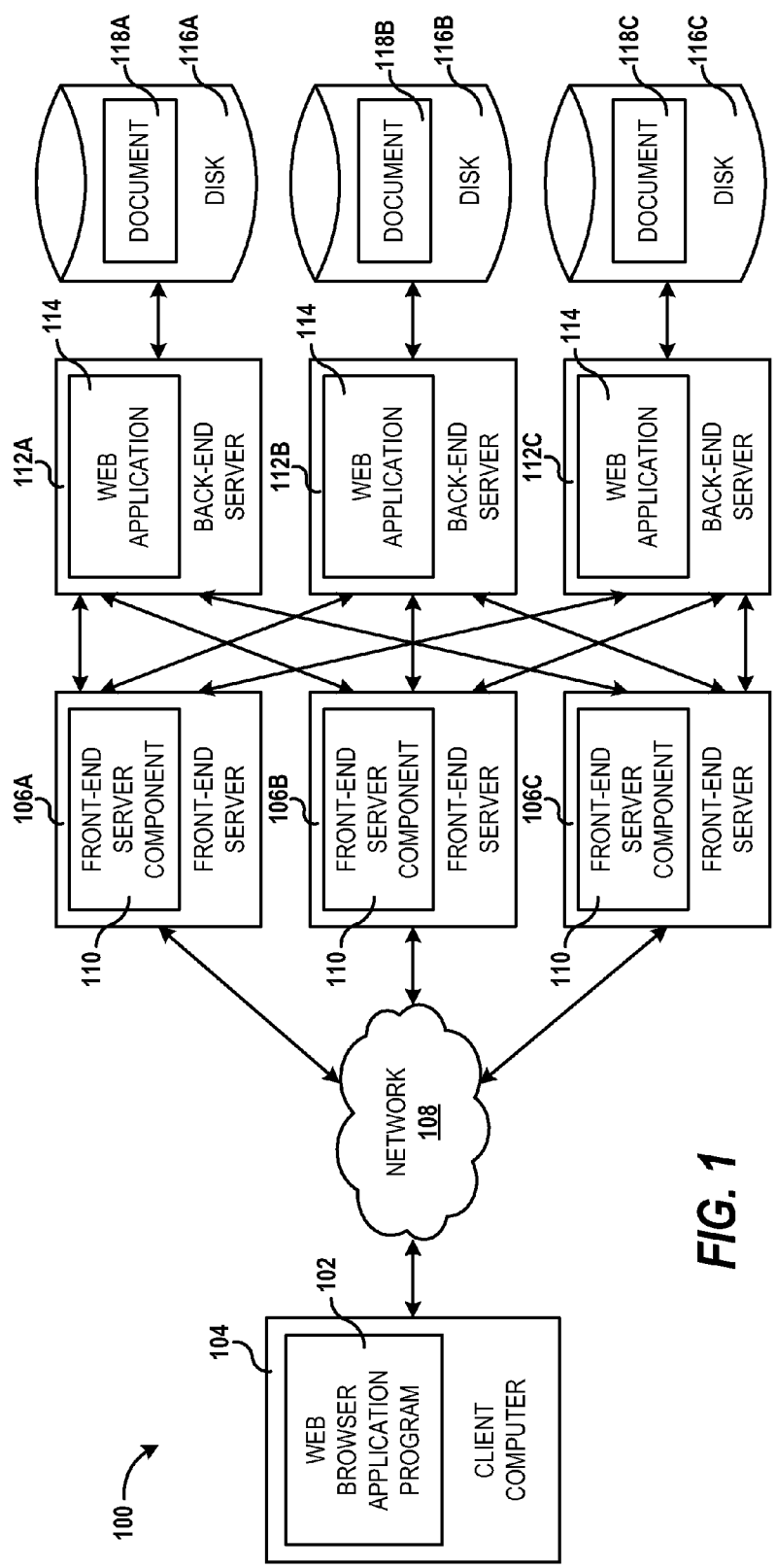
FIG. 1 is a software and network architecture diagram showing one illustrative operating environment for the embodiments disclosed herein.

The following detailed description is directed to technologies for serializing document editing commands. As discussed briefly above, a command stream may be generated using the technologies described herein that includes serialized commands for editing a document. The command stream can be applied to a modified document to generate a single document that contains modifications to the document made using both a Web application and a client application. The command stream can also be utilized to recreate the edited state of a document following the disconnection from a Web application for editing the document, to load balance a server computer hosting the Web application even while editing sessions are in-progress, to perform an upgrade of a server hosting the Web application while editing sessions are in-progress, and for other purposes.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for serializing document editing commands into a command stream and for utilizing the command stream will be described.

FIG. 1 is a software and network architecture diagram showing one illustrative operating environment for the embodiments disclosed herein. The operating environment 100 illustrated in FIG. 1 is configured for providing a Web application 114 to a client computer 104 executing a Web browser application program 102. It should be appreciated that the term "Web application" as utilized herein is intended to encompass an application that can be accessed and utilized through standard protocols and technologies such as HTTP, SOAP, asynchronous JAVASCRIPT, and others. The term "Web application" should not be limited only to applications that are available via the World Wide Web. Rather, a Web application 114 may be accessible through virtually any type of network 108 including, but not limited to, wide area networks, local area networks, wireless networks, and other types of networks.

In the operating environment 100 shown in FIG. 1, a number of front end servers 106A-106C are provided to execute a front end component 110. Requests for the Web application 114 received from the Web browser application program 102 are load balanced to the front end servers 106A-106C. In this way, a front end server 106A-106C may be assigned for a particular document editing session. Commands generated by the Web browser application program 102 for a particular editing session are received by a front end server component 110 on the front end server 106A-106C assigned to the editing session. These commands are then forwarded to an instance of the Web application 114 executing on one of the back end server computers 112A-112C. The back end server computers 112A-112C might also be load balanced in order to ensure that the Web application 114 operates in a performant manner.

As also illustrated in FIG. 1, each of the back end servers 112A-112C maintains one or more disks 116A-116C for storing executable program code, such as an operating system and the Web application 114. The disks 116A-116C might also be utilized to store documents 118A-118C. The documents 118A-118C might also be stored on another location accessible via the network 108 or another network.

According to one implementation, the Web application 114 provides functionality for creating and editing one or more document types. For instance, the Web application 114 may be configured for creating and editing a word processing document, a spreadsheet document, a presentation document, or another type of document. As will be described in greater detail below, a client application executing on the client computer 104 might also be configured to create and edit document types that are compatible with the documents 118A-118C generated by the Web application 114. For instance, a document might be created at the client computer 104 utilizing a client application and then edited by the Web application 114. Similarly, a document might be created at the Web application 114 and then edited utilizing a client application executing on the client computer 104.

It should be appreciated that the operating environment 100 shown in FIG. 1 is merely illustrative and other types of operating environments might also be utilized. For instance, in other embodiments, the front end servers 106A-106C may not be utilized. Additionally, in other embodiments, more or fewer back end servers 112A-112C might also be utilized. Moreover, although a single client computer 104 is illustrated in FIG. 1, it should be appreciated that the operating environment 100 shown in FIG. 1 is capable of supporting many more client computers 104 simultaneously. Other types of operating environments capable of supporting the concepts and technologies described herein may be apparent to those skilled in the art.

Figure 2:
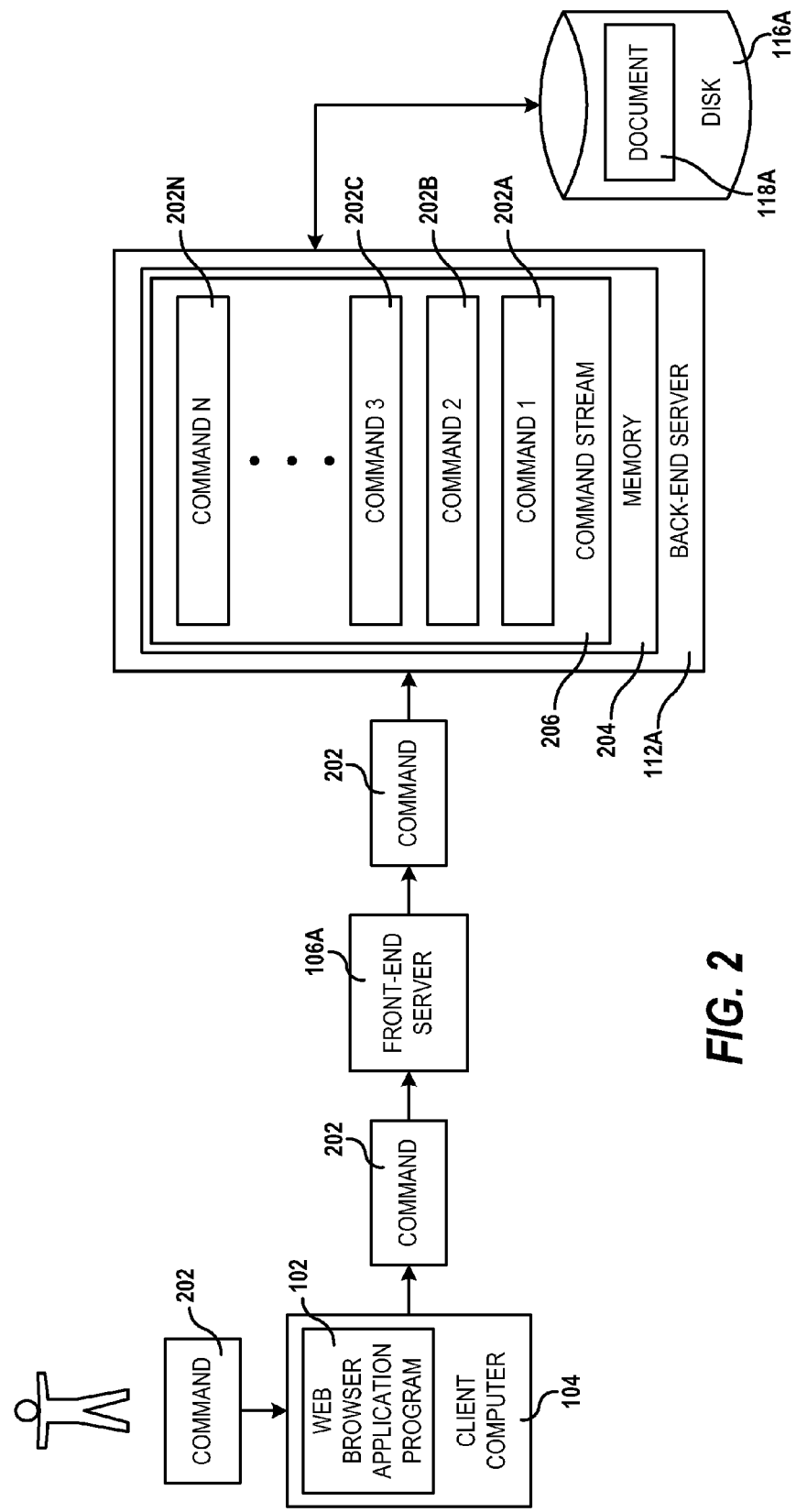
FIG. 2 is a software architecture diagram showing aspects of various components disclosed herein for serializing document editing commands in one embodiment disclosed herein.

FIG. 2 is a software architecture diagram showing aspects of various components disclosed herein for serializing document editing commands in one embodiment disclosed herein. As shown in FIG. 2, and described briefly above, a user of the client computer 104 can utilize the Web browser application 102 to interact with the Web application 114. In particular, a command 202 for modifying a document 118 can be generated at the client computer 104 by a user. For instance, if the document 118 is a presentation document, the command 202 might be for adding a new slide to the presentation, adding a graphical element to the presentation, adding or modifying text in the presentation, or performing any other type of editing task. When the document 118 is a word processing document, the command 202 may be for adding text to the document, formatting text, adding graphics, or performing other edits to the document. It should be appreciated, therefore, that the term command as utilized herein refers to any type of command for modifying a document.

Each command 202 generated at the client computer 104 includes data identifying how the edit should be made to the document 118. The data may be specified utilizing extensible markup language ("XML"), binary encoding, or in another format. For instance, if the command 202 is for editing text in a document 118, the data stored in the command 202 may describe the location within the document at which the edit should occur and how the edit should be performed. If the command 202 is for adding a slide to a presentation, the command 202 might include data indicating the position at which the new slide is to be added, the title of the new slide, and other information. Other types of commands might also be represented similarly.

As discussed briefly above, a command 202 is generated at the client computer 104 and transmitted to a front end server, such as the front end server 106A. In turn, the front end server 106A transmits the command 202 to the appropriate back end server 112, such as the back end server 112A. As discussed briefly above, each back end server 112 executes an instance of the Web application 114. As also discussed briefly above, each back end server 112 maintains, or has access to, a disk storage device 116 storing the document 118 to which the command 202 should be applied. Rather than applying the command 202 directly to a document 118, however, the Web application 114 maintains a command stream 206.

As will be discussed in greater detail below, the command stream 206 includes a serialized sequence of commands 202A-202N. In order to serialize the commands 202, the Web application 114 may add data to the commands 202A-202N indicating the absolute or relative time at which the commands were generated. Other types of data, such as sequence number, might also be used to serialize the commands 202A-202N. The commands 202A-202N are then stored in the command stream 206 in sequential order. In the example shown in FIG. 2, the command stream 206 is stored in a volatile memory 204 of a back end server 112. It should be appreciated that, in other embodiments, the command stream 206 may be stored on a disk 116.

Figure 3:
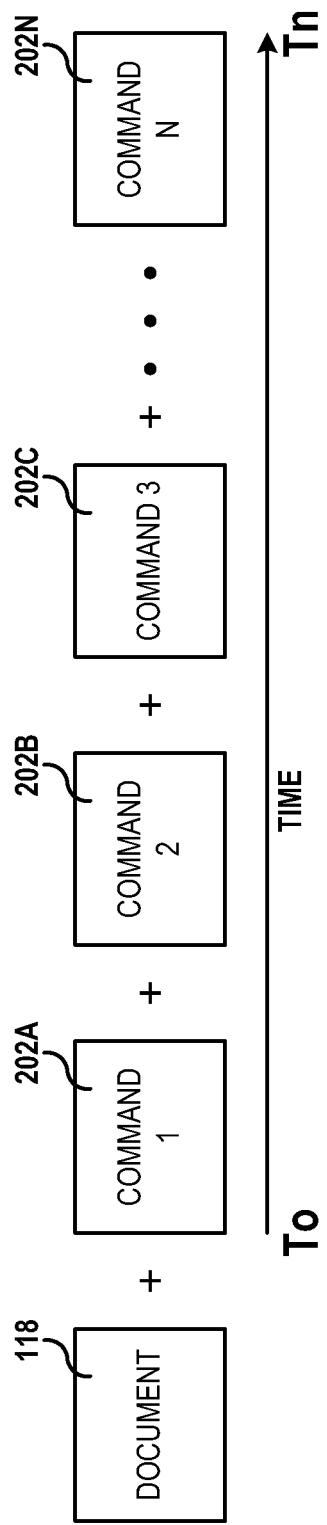
FIG. 3 is a data structure diagram showing aspects of a command stream generated and utilized in embodiments disclosed herein.

FIG. 3 is a data structure diagram showing aspects of a command stream 206 generated and utilized in embodiments disclosed herein. In particular, FIG. 3 shows the commands 202A-202N which have been serialized and placed in sequential order according to the order in which the commands 202A-202N were generated. It should be appreciated, therefore, that the command stream 206 storing the commands 202A-202N represents a delta between the document 118 prior to modification and its current state. As will be described in greater detail below, the Web application 114 can apply the commands 202A-202N to the command stream 206 in serial order in order to generate the current state of the document 118. Details regarding this process and several applications of this process will be described below with reference to FIGS. 4-8.

Figure 4:
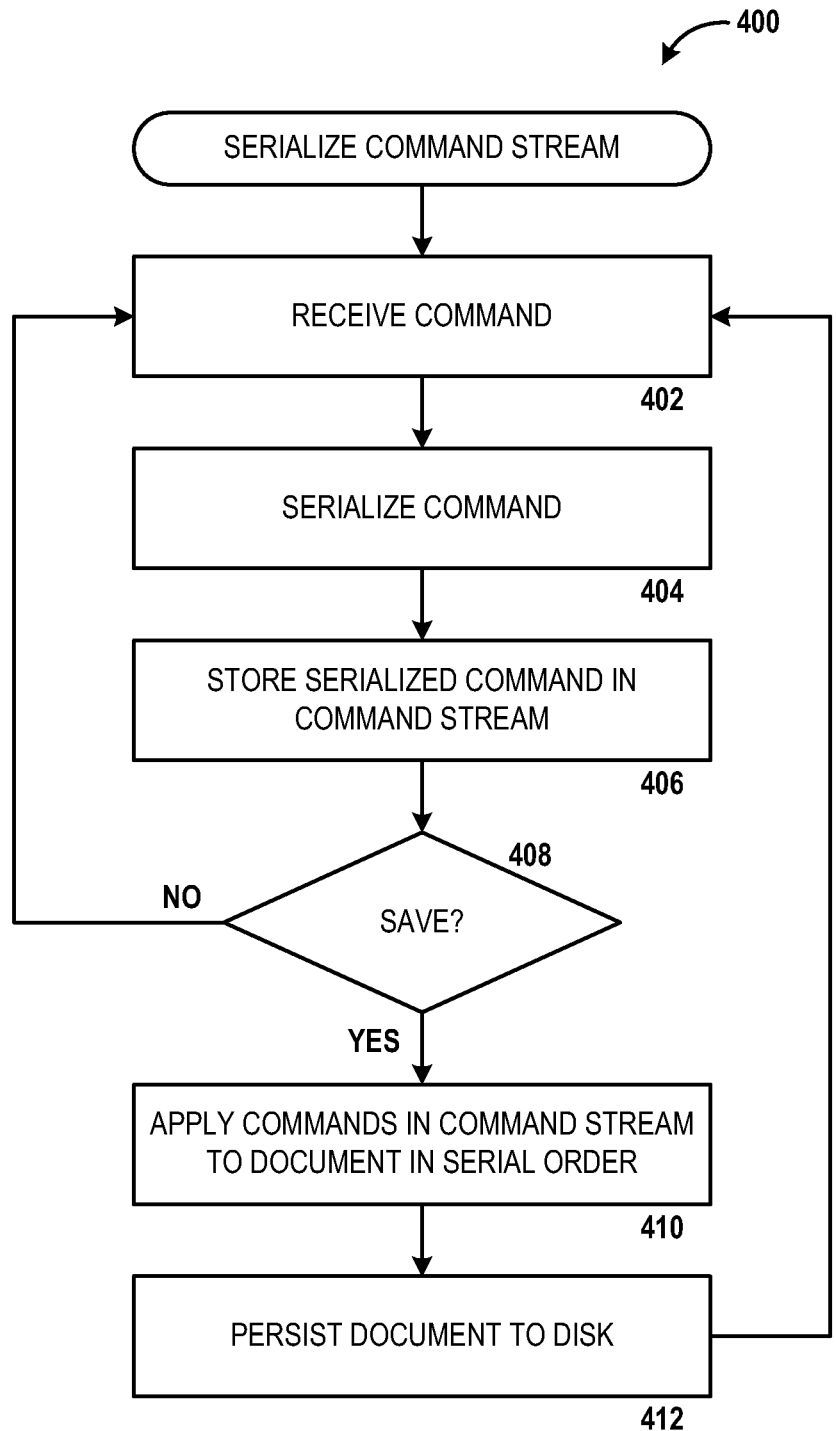
FIG. 4 is a flow diagram showing one illustrative process for serializing a command stream according to one embodiment disclosed herein.

FIG. 4 is a flow diagram showing one illustrative routine 400 for serializing a command stream according to one embodiment disclosed herein. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the Web application 114 receives a command 202. In response to receiving a command, the routine 400 proceeds to operation 404 where the Web application 114 serializes the command 202. This might include, for instance, adding data to the command 202 indicating the absolute or relative time at which the command 202 was received. Other types of mechanisms for serializing the command 202 might also be utilized. Once the command 202 has been serialized, the routine 400 proceeds from operation 404 to operation 406.

At operation 406, the serialized command 202 is stored in the command stream 206. The routine 400 then proceeds to operation 408 where the Web application 114 determines whether a request has been received to save the document 118 corresponding to the command stream. If not, the routine 400 proceeds to operation 402, described above, where additional commands 202 are received and serialized in the manner described above. If a request is received at operation 408 to save the document 118, the routine 400 proceeds to operation 410.

At operation 410, the commands 202A-202N in the command stream 206 for the current document 118 are applied to the document 118 in serial order. In this manner, the commands 202A-202N stored in the command stream 206 are applied to the document 118 in the order in which they were generated. The document 118 following application of the command stream 206 represents the current state of the document 118. Once the command stream 206 has been applied to the document 118, the routine 400 proceeds to operation 412 where the document 118 is persisted to disk. The routine 400 then proceeds to operation 402, where additional commands 202 are received, serialized, and stored in the command stream 206.

Figure 5:
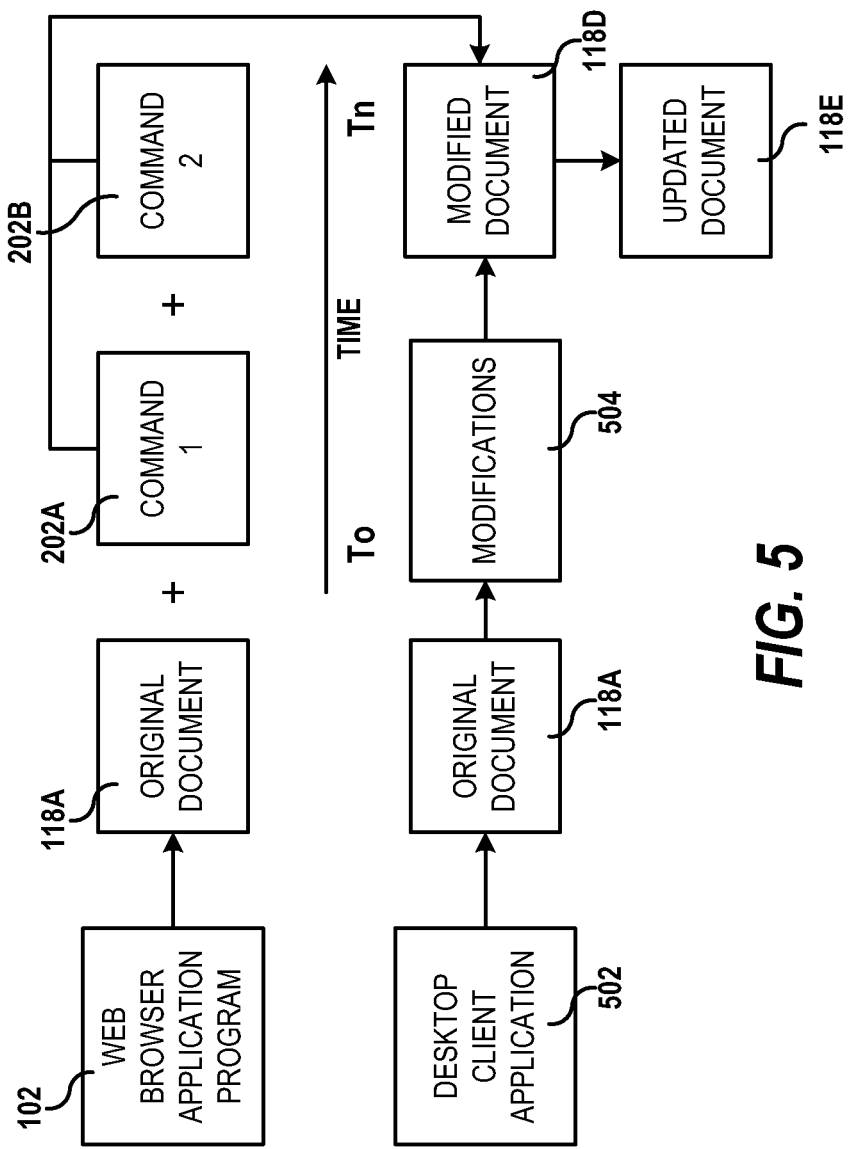
FIG. 5 is a data structure diagram showing aspects of one process for generating a modified document that includes edits made at both a Web application and a client application in one embodiment disclosed herein.

FIG. 5 is a data structure diagram showing aspects of one process for generating a modified document that includes edits made at both a Web application and a client application in one embodiment disclosed herein. As discussed briefly above, a desktop client application 502 might be utilized on the client computer 104 that is capable of editing the documents generated by the Web application 114. For instance, as discussed briefly above, a word processing desktop client application 502 might be utilized to edit a document 118A generated by the Web application 114. Similarly, the Web application 114 might be utilized to edit a document 118A created by the desktop client application 502. In the example shown in FIG. 5, the desktop client application 502 has been utilized to make modifications 504 to an original document 118A. The resulting document is a modified document 118D.

In one scenario, the Web browser application program 102 may utilize the Web application 114 to also make modifications to the original document 118A. As discussed above, however, the modifications to the original document 118A made by way of the Web application 114 are represented in a command stream 206. For instance, in the example shown in FIG. 5, a command stream 206 has been generated that includes two commands 202A-202B.

In order to reconcile the changes between the version of the document generated by the Web application 114 and the version of the document generated by the desktop client application 502, the Web application 114 may be configured to apply the commands 202A-202B in the command stream 206 to the modified document 118D. In this way, an updated document 118E is generated that includes the modifications 504 made to the document 118A by the desktop client application 502 and that also includes the modifications made to the document by way of the Web application 114. By generating an updated document 118E in this manner, the concepts and technologies disclosed herein permit concurrent editing ("co-editing") utilizing a desktop client application 502 and a Web application 114.

It should be appreciated that conflicts might exist in the updated document 118E. For instance, the desktop client application 502 might be utilized to delete a portion of text in the document 118A. Concurrently, the Web application 114 might be utilized to edit the text deleted by way of the desktop client application 502. In this example, a conflict will exist when the command stream 206 is applied to the modified document 118D. It should be appreciated that various mechanisms might be utilized to resolve the conflict. For instance, a user may be asked to choose between the conflicting edits. Other mechanisms might also be used to resolve a conflict between modifications made to a document at a client application 502 and at a Web application 114.

Figure 6:
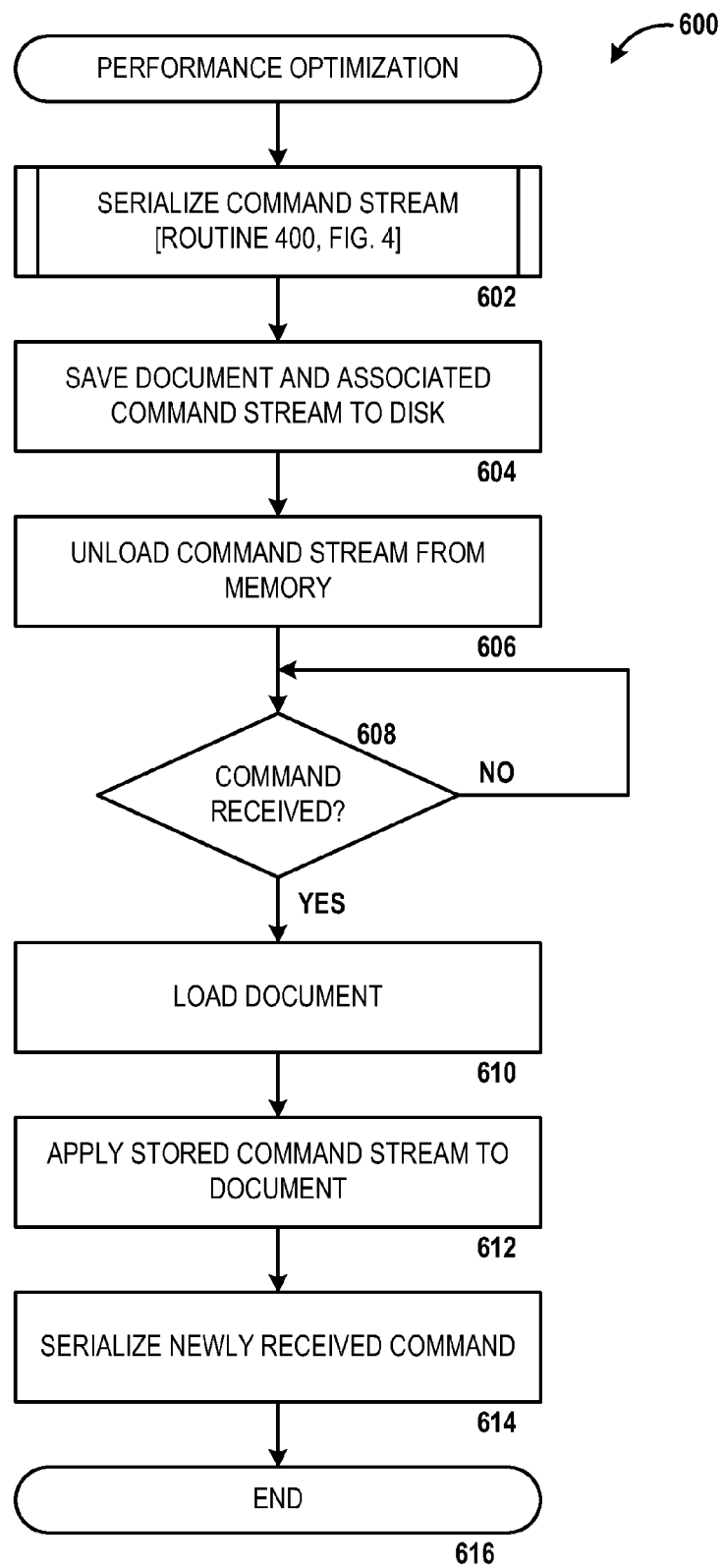
FIG. 6 is a flow diagram showing one illustrative process for optimizing the performance of a Web application using a command stream in one embodiment disclosed herein.

FIG. 6 is a flow diagram showing one illustrative routine 600 for optimizing the performance of a Web application 114 using a command stream 206 in one embodiment disclosed herein. The routine 600 begins at operation 602, where the commands 202 received at the Web application 114 are serialized into the command stream 206. The routine 600 then proceeds from operation 602 to operation 604 where the document 118 and its associated command stream 206 are saved to a disk 116. Once the document 118 and the command stream 206 have been saved, the routine 600 proceeds to operation 606 where the command stream 206 is unloaded from the memory 204. As illustrated in FIG. 2, the command stream 206 might be stored in a volatile memory 204 of a back end server 112. By unloading the command stream 206 from the volatile memory 204, the memory 204 may be freed for other uses.

From operation 606, the routine 600 proceeds to operation 608 where the Web application 114 determines whether an additional command 202 has been received for the saved document 118. If not, the routine 600 proceeds to operation 608 where another such determination is made. If a command is received, the routine 600 proceeds to operation 610 where the document 118 is loaded from disk. The command stream stored on disk may also be loaded into a volatile memory 204 of the back end server 112.

The routine 600 then proceeds to operation 612 where the stored command stream 206 is applied to the document 118 in the manner described above. As discussed above, this results in a document 118 that represents the current state of the document following application of all the commands in the command stream 206. The routine 600 then proceeds to operation 614 where the newly received command is serialized in the command stream 206 in manner described above. From operation 614, the routine 600 proceeds to operation 616, where it ends.

Figure 7:
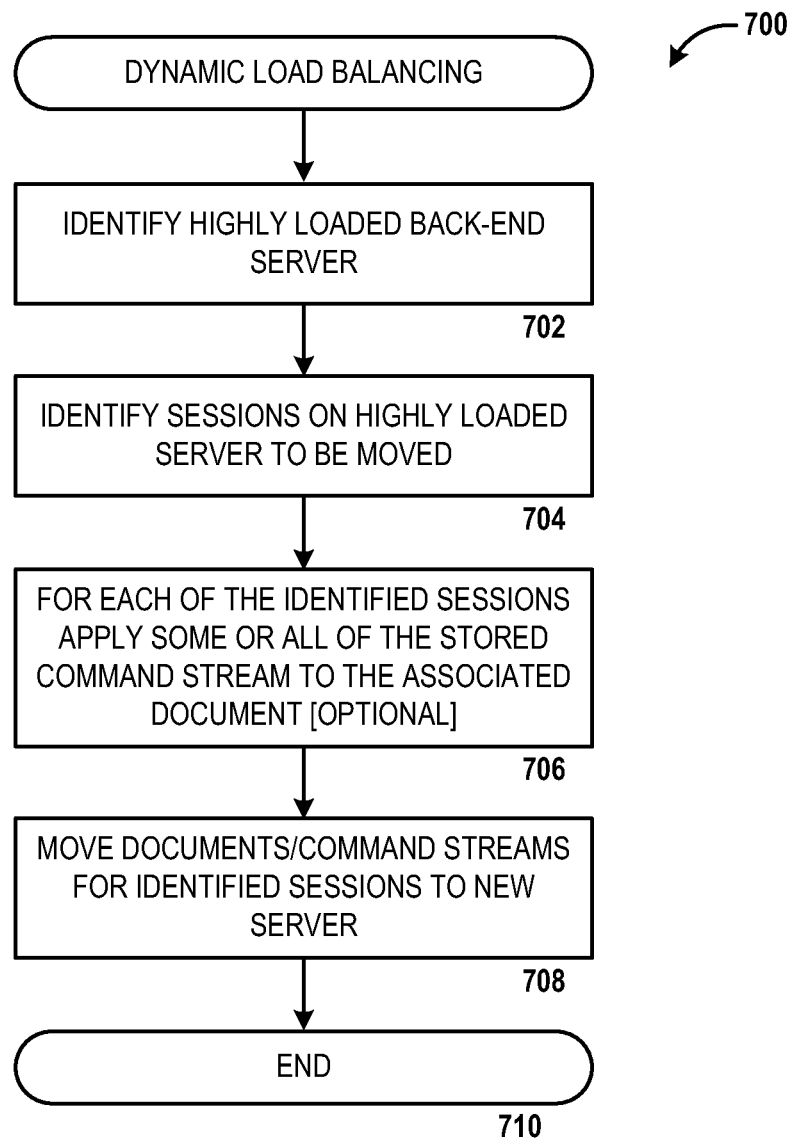
FIG. 7 is a flow diagram showing one illustrative process for dynamically load balancing a server computer hosting a Web application using a command stream in one embodiment disclosed herein.

FIG. 7 is a flow diagram showing one illustrative routine 700 for dynamically load balancing a server computer 112 hosting a Web application using a command stream in one embodiment disclosed herein. The routine 700 begins at operation 702, where a highly loaded back end server 112A-112C is identified. A highly loaded server computer is a server computer that is experiencing a relatively high utilization of its resources, such as CPU cycles, memory utilization, mass storage utilization, and/or high utilization of other types of resources. Once a highly loaded back end server 112A-112C has been identified, the routine 700 proceeds to operation 704.

At operation 704, one or more editing sessions on the identified highly loaded back end server 112A-112C to be moved to another back end server are identified. The in-progress editing sessions to be moved to another server 112 may be identified based upon the resources utilized by the editing session, randomly, or in another fashion. Once one or more in-progress editing sessions to be moved to another server 112 have been identified, the routine 700 proceeds to operation 706.

At operation 706, some or all of the commands in the command stream 206 for the identified editing sessions may be applied to the associated document. In this manner, each document may be brought to its current state prior to moving the document to another back end server 112. It should be appreciated that this process is optional and that the command stream 206 may not be applied to a document associated with an in-progress editing session prior to moving the editing session to another back end server 112.

From operation 706, the routine 700 proceeds to operation 708 where the documents 118 and command streams 206 for the identified in-progress editing sessions are moved to a non-highly loaded back end server 112A-112C. The back end server 112A-112C to which the in-progress editing sessions are moved may be identified based upon the utilization of resources by the destination back end server, such as CPU utilization, memory utilization, disk utilization, and/or utilization of other types of resources. The back end server 112A-112C to which the in-progress editing sessions have been moved then takes over responsibility for handling the in-progress editing sessions. In this manner, any new commands received for the in-progress editing sessions will be handled by the destination back end server 112A-112C. It should be appreciated, therefore, that the back end servers 112A-112C may be dynamically load balanced without interrupting in-progress editing sessions. From operation 708, the routine 700 proceeds to operation 710, where it ends.

Figure 8:
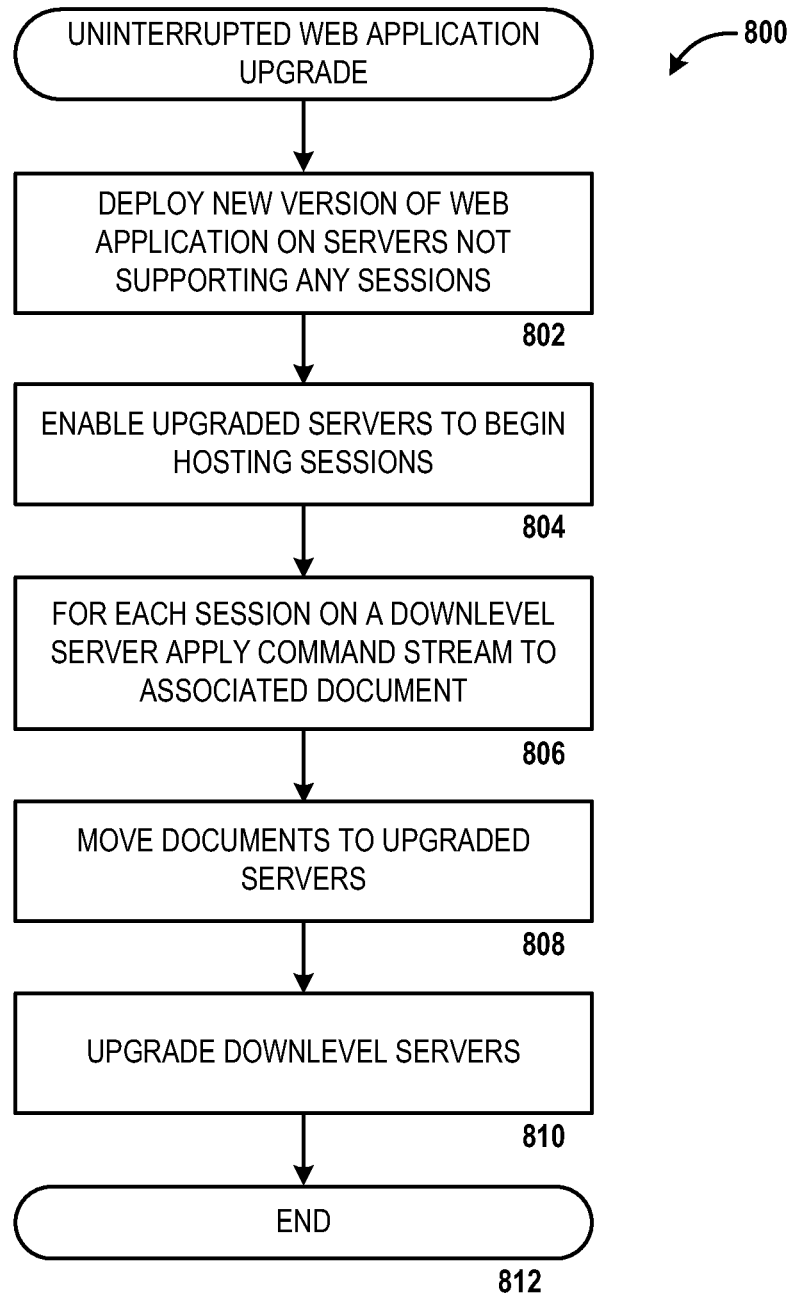
FIG. 8 is a flow diagram showing one illustrative process for upgrading a Web application using a command stream in one embodiment disclosed herein.

FIG. 8 is a flow diagram showing one illustrative routine 800 for upgrading a Web application using a command stream in one embodiment disclosed herein. The routine 800 begins at operation 802, where an up-level version of the Web application 114 is deployed on back end servers 112 not currently supporting any editing sessions. The routine 800 then proceeds to operation 804 where the upgraded servers 112 are enabled to begin hosting editing sessions. Once the up level servers 112 have been enabled for hosting editing sessions, the routine 800 proceeds to operation 806.

At operation 806, the in-progress editing sessions on a back end server 112 executing a down level Web application 114 are identified. For each identified in-progress editing session, the commands 202 in the command stream 206 are applied to the associated document. The routine 800 then proceeds to operation 808 where the documents for the in-progress editing sessions are moved to the upgraded servers 112 executing the up level version of the Web application 114. The server computers to which the documents are moved then take over responsibility for hosting the in-progress editing session.

Once all of the in-progress editing sessions have been moved off of a down level back end server 112, the routine 800 proceeds to operation 810 where the down level server computers may be upgraded with an up-level version of the Web application 114. The routine 800 then proceeds from operation 810 to operation 812, where it ends. In view of the above, it should be appreciated that the Web application 114 maybe upgraded without disturbing in-progress editing sessions.

Figure 9:
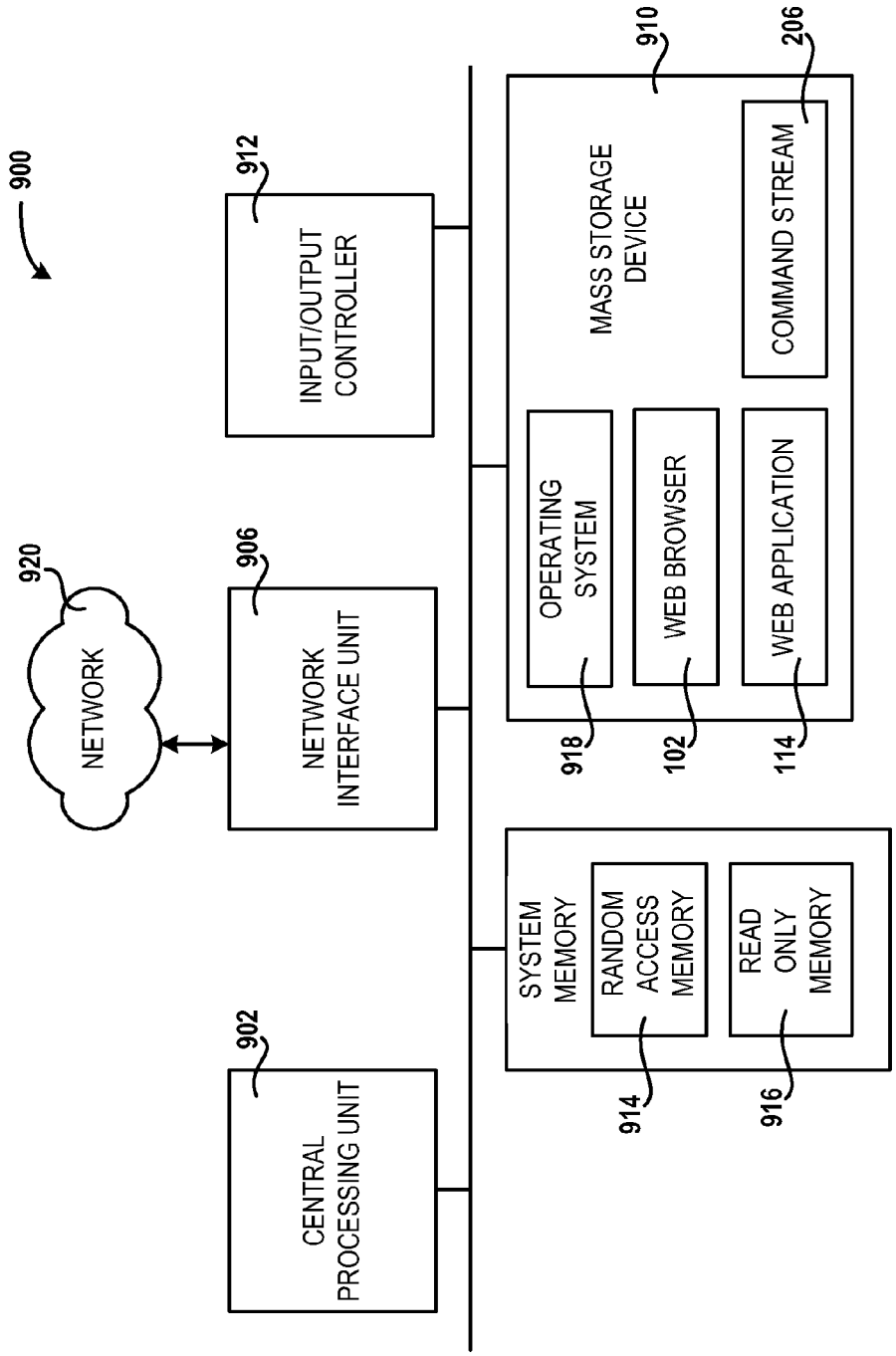
FIG. 9 is a computer architecture diagram showing an illustrative computer hardware and software architecture for a computing system capable of implementing the various embodiments presented herein.

FIG. 9 is a computer architecture diagram showing an illustrative computer hardware and software architecture for a computing system capable of implementing the various embodiments presented herein. The computer architecture shown in FIG. 9 illustrates a conventional desktop, laptop computer, or server computer and may be utilized to execute the various software components described herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system ("BIOS") containing the basic routines that help to transfer information between elements within the computer 900, such as during startup, is stored in the ROM 916. The computer 900 further includes a mass storage device 910 for storing an operating system 918, application programs, and other program modules, which will be described in greater detail below.

The mass storage device 910 is connected to the CPU 902 through a mass storage controller (not shown) connected to the bus 904. The mass storage device 910 and its associated computer-readable storage media provide non-volatile storage for the computer 900. Although the description of computer-readable media contained herein refers to a mass storage device, such as a hard disk or CD-ROM drive, it should be appreciated by those skilled in the art that computer-readable storage media can be any available computer storage media that can be accessed by the computer 900.

By way of example, and not limitation, computer-readable storage media may include volatile and non-volatile, removable and non-removable media implemented in any method or technology for storage of information such as computer-readable instructions, data structures, program modules or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other non-transitory medium which can be used to store the desired information and which can be accessed by the computer 900.

It should be appreciated that the computer-readable media disclosed herein also encompasses communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Computer-readable storage media does not encompass communication media.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 918 suitable for controlling the operation of a networked desktop, laptop, or server computer. The mass storage device 910 and RAM 914 may also store one or more program modules. In particular, the mass storage device 910 and the RAM 914 may store the Web browser application program 102 and/or the Web application 114, and the other software components described above. The mass storage device 910 and RAM 914 may also store other program modules and data, such as the command stream 206.

In general, software applications or modules may, when loaded into the CPU 902 and executed, transform the CPU 902 and the overall computer 900 from a general-purpose computing system into a special-purpose computing system customized to perform the functionality presented herein. The CPU 902 may be constructed from any number of transistors or other discrete circuit elements, which may individually or collectively assume any number of states. More specifically, the CPU 902 may operate as one or more finite-state machines, in response to executable instructions contained within the software or modules. These computer-executable instructions may transform the CPU 902 by specifying how the CPU 902 transitions between states, thereby physically transforming the transistors or other discrete hardware elements constituting the CPU 902.

Encoding the software or modules onto a mass storage device may also transform the physical structure of the mass storage device or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for serializing document editing commands into a command stream and for utilizing the command stream have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising performing computer-implemented operations for:
    storing a document on a server computer;
    receiving a plurality of user commands using web-based applications to modify the document;
    serializing the received commands;
    storing the serialized commands in sequential order in a command stream separate from the document;
    determining whether the server computer is a highly loaded server computer;
    if the server computer is a highly loaded server computer then determining whether there is an in-progress document editing session for the document; and
    if there is an in-progress document editing session, applying the command stream to the document; and then
    moving the document to a non-highly loaded server computer.

2. The computer-implemented method of claim 1, further comprising:
    receiving a request to save the document; and
    in response to receiving the request, applying the commands in the command stream to the document in serial order and saving the document.

3. The computer-implemented method of claim 2, wherein a first application modifies the document to generate a modified document, and wherein a second application applies the commands in the serialized command stream to the modified document.

4. The computer-implemented method of claim 3, wherein the first application comprises a desktop client application, and wherein the second application comprises a web application.

5. The computer-implemented method of claim 1, further comprising:
    saving the document and the command stream to a mass storage device;
    unloading the command stream from a volatile memory;
    receiving a second command;
    in response to receiving the second command, loading the document from the mass storage device, applying the command stream to the document, serializing the second command, and storing the serialized second command in the command stream separate from the document.

6. The computer-implemented method of claim 1, further comprising:
    determining whether the in-progress document editing session is on a server computer executing a down level application program for editing the document;
    if the in-progress document editing session is on a server computer executing a down level application program, then moving the document and the command stream associated with the in-progress document editing session to a server computer executing an up level application program for editing the document.

7. The computer-implemented method of claim 6, further comprising applying the commands in the command stream to the document in serial order prior to moving the document to the server computer executing the up level application program.

8. A computer-readable storage medium having computer-executable instructions stored thereupon which, when executed by a computer, cause the computer to:
    store a document on a server computer;
    receive a plurality of user commands using web-based applications to modify the document;
    serialize the received commands;
    store the serialized commands in sequential order in a command stream separate from the document;
    receive a request to save the document;
    in response to receipt of the request, determine whether the server computer is a highly-loaded computer;
    if the server computer is a highly loaded server computer then determine whether there is an in-progress document editing session for the document;

if there is an in-progress document editing session then apply the commands in the command stream to the document in serial order and save the document; and then move the saved document to a non-highly loaded server computer.

9. The computer-readable storage medium of claim 8, wherein a first application modifies the document to generate a modified document, and wherein a second application applies the commands in the serialized command stream to the modified document.

10. The computer-readable storage medium of claim 9, wherein the first application comprises a desktop client application, and wherein the second application comprises a web application.

11. The computer-readable storage medium of claim 9, having further computer-executable instructions stored thereupon which, when executed by the computer, cause the computer to:

determine whether the in-progress document editing session is on a server computer executing a down level application program for editing the document;

if the in-progress document editing session is on a server computer executing a down level application program, then move the document and the command stream associated with the in-progress document editing session to a server computer executing an up level application program for editing the document.

12. The computer-readable storage medium of claim 11, having further computer-executable instructions stored thereupon which, when executed by the computer, cause the computer to apply the commands in the command stream to the document in serial order prior to moving the document to the server computer executing the up level application program.

13. The computer-readable storage medium of claim 8, having further computer-executable instructions stored thereupon which, when executed by the computer, cause the computer to:

save the document and the command stream to a mass storage device;

unload the command stream from a volatile memory of the computer;

receive a second command;

in response to receiving the second command, load the document from the mass storage device, apply the command stream to the document, serialize the second command, and store the serialized second command in the command stream separate from the document.

14. A computer-implemented method comprising performing computer-implemented operations for:

storing a document on a server computer;

receiving a plurality of user commands using web-based applications to modify the document at a first application;

serializing the received commands by way of the first application;

storing the serialized commands in sequential order in a command stream separate from the document;

modifying the document by way of a second application to create a modified document;

determining whether the server computer is a highly loaded server computer;

if the server computer is a highly loaded server computer then determining whether there is an in-progress document editing session for the document;

if there is an in-progress document editing session then applying the serialized commands in the command stream to the modified document by way of the first application; and then moving the document to a non-highly loaded server computer.

15. The computer-implemented method of claim 14, further comprising:

receiving a request at the first application to save the document; and in response to receiving the request, applying the commands in the command stream to the document in serial order and saving the document.

16. The computer-implemented method of claim 15, further comprising:

saving the document and the command stream to a mass storage device;

unloading the command stream from a volatile memory;

receiving a second command;

in response to receiving the second command, loading the document from the mass storage device, applying the command stream to the document, serializing the second command, and storing the serialized second command in the command stream separate from the document.

17. The computer-implemented method of claim 14, further comprising:

identifying whether the in-progress document editing session is on a server computer executing a down level application program for editing the document;

if the in-progress document editing session is on a server computer executing a down level application program, then applying the commands in the command stream to the document; and moving the document to a server computer executing an up level application program for editing the document.

* * * * *